(12) United States Patent
Malich et al.

(10) Patent No.: US 8,138,748 B2
(45) Date of Patent: Mar. 20, 2012

(54) POSITION SENSOR FOR EVALUATING AXLE POSITIONING

(75) Inventors: Bernd Malich, Bonndorf (DE); Dieter Moser, Bonndorf (DE); Bernd Egger, Hüfingen (DE)

(73) Assignee: Alcatel Lucent, Paris (FR)

( * ) Notice: Subject to any disclaimer, the term of this patent is extended or adjusted under 35 U.S.C. 154(b) by 260 days.

(21) Appl. No.: 12/316,187

(22) Filed: Dec. 10, 2008

(65) Prior Publication Data

US 2009/0146646 A1    Jun. 11, 2009

(30) Foreign Application Priority Data

Dec. 11, 2007  (EP) ..................... 07301661

(51) Int. Cl.
*G01B 7/14* (2006.01)
(52) U.S. Cl. ............................. 324/207.13; 324/207.11
(58) Field of Classification Search .................. None
See application file for complete search history.

(56) References Cited

U.S. PATENT DOCUMENTS

| | | | | |
|---|---|---|---|---|
| 4,274,053 A | * | 6/1981 | Ito et al. | 324/174 |
| 4,490,674 A | * | 12/1984 | Ito | 324/207.25 |
| 6,324,452 B1 | * | 11/2001 | Ikegaya | 701/41 |
| 6,691,008 B2 | * | 2/2004 | Kondo et al. | 701/41 |
| 2006/0243469 A1 | * | 11/2006 | Webster | 173/217 |

FOREIGN PATENT DOCUMENTS

| | | |
|---|---|---|
| GB | 1 192 757 A | 5/1970 |
| JP | 63 103912 A | 5/1988 |
| JP | 2005 094864 A | 4/2005 |
| WO | WO 03/008747 A | 1/2003 |

* cited by examiner

*Primary Examiner* — Vinh Nguyen
(74) *Attorney, Agent, or Firm* — Carmen Patti Law Group, LLC

(57) ABSTRACT

A position sensor (PS) that is in position to deliver data for evaluating positioning data of an axle (OS) over a specified number of turns, where two transmissions (G1, G2) are affixed to the axle (OS) for being in position to transmit each the position of the axle to a rotary encoder (RE), the transmission ratios being chosen such that over the specified number of turns of the axle (OS) both transmissions (G1, G2) at the output differ in one turn, as well as to an evaluation circuit, and to an electric motor.

10 Claims, 2 Drawing Sheets

POSITION SENSOR FOR EVALUATING AXLE POSITIONING

BACKGROUND OF THE INVENTION

The invention is based on a priority application EP07301661.0 which is hereby incorporated by reference.

The invention relates to a position sensor that is in position to deliver data for evaluating positioning data of an axle over a specified number of turns, to an evaluation circuit for such position sensor, and to an electric motor therewith.

A position sensor of this kind is known from WO 03/008747 A1.

Electric motors often are used to achieve linear movements between two end positions. Examples therefor are Venetian blinds or windows in cars. The end positions of such linear movement correspond to two rotary positions at the ends of a specified number of turns.

When one wants to detect not only the end positions but also certain positions in between, one needs a position sensor that is in position to deliver the necessary data, at least as a starting point for evaluating such positions.

It is the object to provide such position sensor, an evaluation circuit therefore and an electric motor with such position sensor.

SUMMARY OF THE INVENTION

This object is achieved by a position sensor that is in position to deliver data for evaluating positioning data of an axle over a specified number of turns, wherein two transmissions are affixed to the axle for being in position to transmit each the position of the axle to a rotary encoder, the transmission ratios being chosen such that over the specified number of turns of the axle both transmissions at the output differ in one turn, an evaluation circuit for a position sensor that is in position to deliver data for evaluating positioning data of an axle over a specified number of turns, wherein two transmissions are affixed to the axle for being in position to transmit each the position of the axle to a rotary encoder, the transmission ratios being chosen such that over the specified number of turns of the axle both transmissions at the output differ in one turn, that is provided with a rotary encoder for each gear, with a decoder being faced vis-à-vis to each rotary encoder, and including means that determine absolute values depending on the rotary positions sensed by the two rotary encoders, and an electric motor that is provided with a position sensor that is in position to deliver data for evaluating positioning data of an axle over a specified number of turns, wherein two transmissions are affixed to the axle for being in position to transmit each the position of the axle to a rotary encoder, the transmission ratios being chosen such that over the specified number of turns of the axle both transmissions at the output differ in one turn.

The idea is to use two transmissions, especially fear or pinion transmissions with one turn of output difference over the whole specified number of turns.

Further embodiments of the invention are to be found in the subclaims and in the following description.

FIG. 1 shows an output gear wheel OGW of an electric motor, a holding plate HP1, four gear wheels GW1, GW2, GW3, and GW4, three distance pieces DP, and an output shaft OS. These parts without the output gear wheel OGW are considered a position sensor PS according to the invention.

Preferably the output shaft OS, here acting as the axle of the position sensor according to the invention, is made together with the output gear wheel OGW as one single piece. As a consequence the position sensor PS preferably is assembled together with an electric motor.

The holding plate HP1 carries the parts building the position sensor. To this end the output shaft penetrates the holding plate.

Two of the gear wheels, gear wheel GW1, and gear wheel GW3, are fixedly attached to the output shaft on the side of the holding plate HP1 opposite to the output gear wheel OGW.

The two other gear wheels, GW2, and GW4, are mounted such that they mesh with the gear wheel GW1, and GW2, respectively.

Gear wheel GW1 forms a first gear G1 together with gear wheel GW2, having a transmission ratio of n1; gear wheel GW3 forms a second gear G2 together with gear wheel GW4, having a transmission ratio of n2.

Now according to the invention the transmission ratios are chosen such that over the specified number of turns of the axle or output shaft OS both transmissions at the output differ in one turn.

If $z_i$ is the number of teeth of gear wheel GWi, the transmission ratio $n1=z1/z2$, the transmission ratio $n2=z3/z4$, then, with $n2>n1$, the multi-turn number MT is $n2/(n2-n1)$. This is the number of turns of gear wheel GW2 while gear wheel GW2 has made exactly one turn more than gear wheel GW4. This multi-turn number MT is the number of turns of the secondary side of the gear and has to be counted back to the primary side, that is the side of the output shaft OS. The given, specified number of turns then is MT/n2.

In an easy to understand example (different from what is shown in the figure) we want to have a unique resolution within MT=100 turns of the output shaft. Let now be the number of teeth $z1=z2=z4=99$, and $z3=100$, then MT=100. In a more practical example the number of teeth is $z1=65$, $z2=52$, $z3=63$, and $z4=50$. This results in MT=126, corresponding to 100 turns of the output shaft OS.

Figure 1:
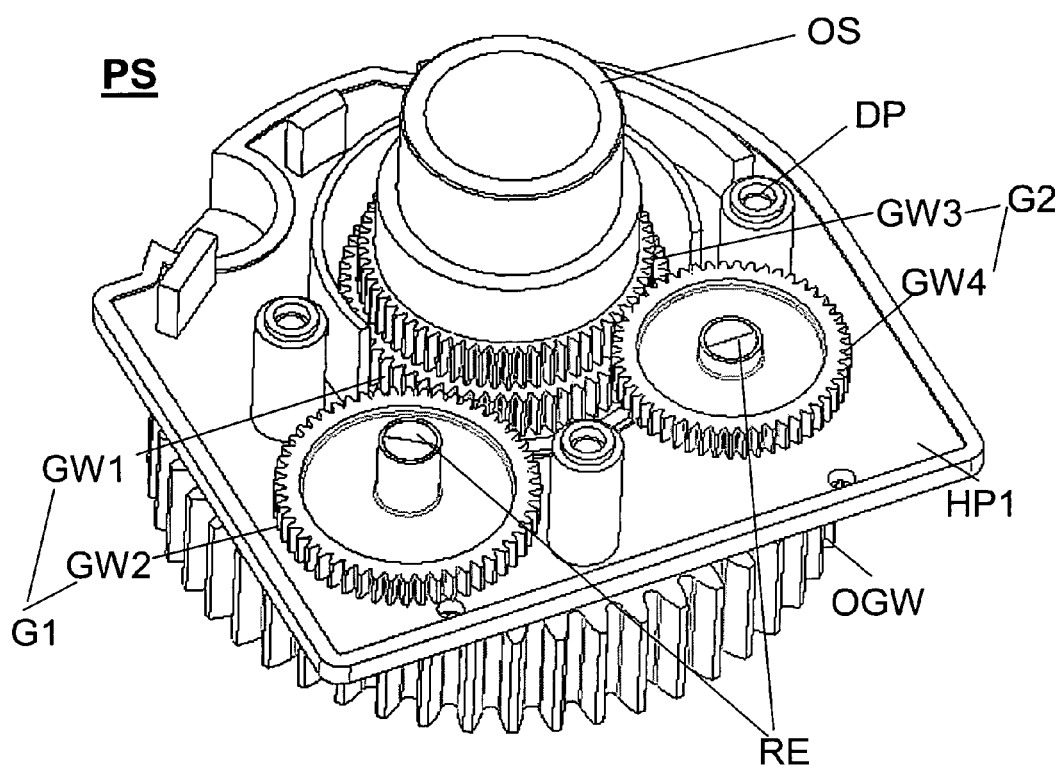
FIG. 1 shows an electric motor's output stage and a position sensor according to the invention in a perspective view.

What looks like fixed mountings for the gear wheels GW2 and GW4 in FIG. 1 actually are axles of these gear wheels, and rotating together with them. At their above ends rotary encoders RE, in an example so-called two-pole magnets, are attached, in the figure shown as dashes across the upper ends.

Figure 2:
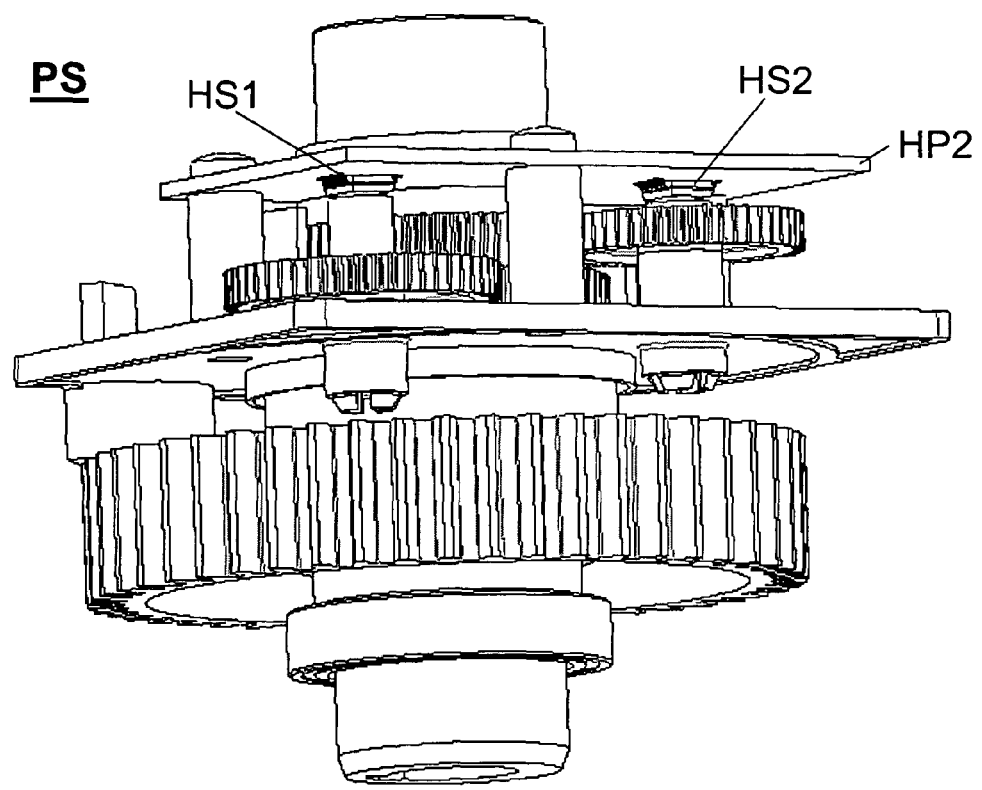
FIG. 2 shows an electric motor's output stage and a position sensor according to the invention in an other perspective view.

What we see in FIG. 1 more as a top view, now in FIG. 2 is seen more from the bottom.

In addition to what is already to be seen in FIG. 1, we now also see a holding plate HP2, in practice a printed circuit board, carrying two contactless magnetic rotary encoders or Hall sensors HS1, and HS2.

The holding plate HP2 is mounted on the distance pieces DP already mentioned. The two Hall sensors HS1, and HS2 represent whatever decoders for decoding the angular positions of the rotary encoders mentioned above. Rotary encoders RE and the associated decoders HS1, and HS2 are faced vis-à-vis to each other.

Instead of Hall sensors of course any other kind of magnetic field sensor could be used.

Instead of magnetic encoders and decoders any other suitable pair could be used. For example with light barriers the resolution easily could be increased, if necessary.

It is clear that any other kind of gear could be used, not only spur gear as shown here. And also other kinds of transmissions like those with friction wheels or with belts could be used.

In this example the output gear wheel OGW shows, that the whole position sensor is intended to become an integral part of the electric motor, to which it is assigned. But it might as well be produced as stand-alone unit.

The sensors mentioned and shown here only can provide raw data. They necessarily have to be evaluated in whatever kind of evaluation circuit. And of course the sensors need to be brought in a loop of such evaluation circuit. Depending on the kind of sensor this is well known to persons skilled in the art. Conditioning of raw data versus final position data could be done by means of counters and look-up tables or using mathematical equations.

From the raw data also start and end of the specified number of turns can be derived and used as end positions of the device to be driven. The motor then can be stopped there.

Such evaluation circuits may be produced as stand-alone units or integrated into the associated electric motor.

The invention claimed is:

1. Position sensor (PS) that is in position to deliver data for evaluating positioning data of an axle (OS) over a specified number of turns, comprising:
   two transmissions (G1, G2) affixed to the axle (OS) for being in position to transmit each the position of the axle to a rotary encoder (RE), characterized in, that the transmission ratios being chosen such that over the specified number of turns of the axle (OS) both transmissions at an output differ in one turn.

2. Position sensor according to claim 1, wherein the transmissions are single-stage pinion or friction gear or belt driven transmissions.

3. Position sensor according to claim 1, further comprising a rotary encoder for each gear.

4. Position sensor according to claim 3, wherein the rotary encoders are positioning magnets.

5. Position sensor according to claim 3, further comprising a decoder is faced vis-à-vis to each rotary encoder.

6. Position sensor according to claim 5, wherein each decoder is a magnetic field sensor.

7. The position sensor according to claim 5, further comprising an evaluation circuit that determines absolute values depending on rotary positions sensed by the two rotary encoders.

8. The position sensor according to claim 7, wherein the evaluation circuit detects start and end of the specified number of turns as end positions.

9. The position sensor according to claim 1, where the position sensor is integrated with an electric motor.

10. The position sensor of claim 9, wherein the electric motor further comprises an evaluation circuit.

* * * * *